United States Patent [19]

Rehmat et al.

[11] Patent Number: 5,243,922
[45] Date of Patent: Sep. 14, 1993

[54] ADVANCED STAGED COMBUSTION SYSTEM FOR POWER GENERATION FROM COAL

[75] Inventors: Amirali G. Rehmat, Darien; Lev Dorfman, Skokie, both of Ill.

[73] Assignee: Institute of Gas Technology, Chicago, Ill.

[21] Appl. No.: 923,316

[22] Filed: Jul. 31, 1992

[51] Int. Cl.$^5$ .................................................. F23B 7/00
[52] U.S. Cl. ........................................ 110/233; 48/77;
48/101; 48/197 R; 48/210; 110/229; 110/341;
110/347; 122/1 R
[58] Field of Search ............... 110/229, 245, 233, 234,
110/341, 347; 122/1 R, 5; 48/77, 101, 197 R,
210

[56] References Cited

U.S. PATENT DOCUMENTS

| | | |
|---|---|---|
| 4,315,758 | 2/1982 | Patel et al. . |
| 4,321,233 | 3/1982 | Tsuji et al. .................... 48/210 X |
| 4,338,283 | 7/1982 | Sakamoto et al. . |
| 4,407,206 | 10/1983 | Bartok et al. . |
| 4,430,094 | 2/1984 | Gorzegno ...................... 110/229 X |
| 4,732,091 | 3/1988 | Gould .................................. 110/229 |
| 4,796,568 | 1/1989 | Pillai . |
| 4,815,418 | 3/1989 | Maeda et al. . |
| 4,823,712 | 4/1989 | Wormer . |
| 4,828,486 | 5/1989 | Sakamoto et al. . |
| 4,872,886 | 10/1989 | Henley et al. . |
| 4,896,497 | 1/1990 | Pillai ............................. 110/229 X |
| 4,993,332 | 2/1991 | Boross et al. . |
| 5,033,413 | 7/1991 | Zenz et al. . |
| 5,069,685 | 12/1991 | Bissett et al. ........................ 48/77 |

OTHER PUBLICATIONS

Kurkela, E., "Gasification Combined Cycle Power Generation-Process Alternatives", *Proceedings of VTT Symposium 83-Fluidized Bed Combustion and Gasification Systems,* Espoo, Finland, 37-52, 1987.

Robertson, A. et al., "Second Generation PFB Combustion Plants," paper presented at GEN-UPGRADE 90 International Symposium, Washington, D.C., Mar. 1990.

*Primary Examiner*—Edward G. Favors
*Attorney, Agent, or Firm*—Speckman, Pauley & Fejer

[57] ABSTRACT

A process and apparatus for generating electricity from coal comprising a vertically stacked, three-stage combustor in which a sorbent is calcined in a calciner zone of the combustor and transferred to a carbonizer zone disposed below the calciner zone, coal introduced into the carbonizer zone is carbonized, producing char and spent sorbent, both of which are transferred to a combustor zone disposed below the carbonizer zone, in which the char is combusted at a substoichemetic air-to-coal ratio, producing a fuel gas. The fuel gas is cleaned and combusted in a turbine combustor, producing a flue gas which is introduced into a gas turbine for producing electricity.

34 Claims, 3 Drawing Sheets

ADVANCED STAGED COMBUSTION SYSTEM FOR POWER GENERATION FROM COAL

BACKGROUND OF THE INVENTION

1. Field of the Invention

This invention relates to a process and apparatus for generating electricity from coal using pressurized fluidized bed combustion for converting coal to a fuel gas.

2. Description of the Prior Art

The electric utility industry is constantly seeking new electricity generation technology which can operate with substantially improved efficiencies and improved environmental performance. In conventional power plants, solid fuel is combusted under atmosoheric pressure and steam is generated producing electricity at an overall efficiency of less than 40%. The resulting flue gas is cleaned and subsequently exhausted into the atmosphere.

One power generation scheme under development for increasing the efficiency and improving the environmental performance of electricity generating plants is the integrated gasification combined cycle (IGCC) in which the solid fuel, typically coal, is first gasified under pressure. The resulting fuel gas is cleaned, burned in a combustion chamber, and then expanded in a gas turbine. Such systems, which can employ a wide variety of gasification technologies, are taught by Kurkela, E. "Gasification Combined Cycle Power Generation-Process Alternatives", *Proceedings of VTT Symposium 83-Fluidized Bed Combustion and Gasification Systems*, Espoo, Finland, 37-52, 1987.

An alternative to gasification of the solid fuel to produce a fuel gas as in the IGCC power generation system is pressurized fluidized bed combustion in which the solid fuel is fed to a pressurized carbonizer, producing a low Btu fuel gas and char. After cleaning, the fuel gas is burned in a combustor along with flue gas produced from residual char combustion to produce energy which drives the gas turbine. Such a system is taught by Robertson, A. et al., "Second Generation PFB Combustion Plants," paper presented at GEN-UPGRADE 90 International Symposium, Washington, D.C., March 1990.

Both the integrated gasification combined cycle system as well as second generation pressurized fluidized bed combustion systems with topping cycles have achieved coal to electricity conversion efficiencies up to 45% using advanced turbine technology with gas inlet temperatures of approximately 2300° F. However, due to the nature of the required processing steps which are temperature limited due to the amount of process heat which is extracted from the system and used for steam generation prior to delivery of the gas and subsequent extraction of power from the gas turbine, the efficiency of these systems is generally limited. For example, the gasification system which propels the IGCC system is operated in the range of 1800°-2000° F. The resulting fuel gas at these temperatures must be cooled to approximately 1000° F. for removal of sulfur compounds prior to combustion in the turbine combustor. The heat recovered from cooling the gas is used in generating steam in a relatively less efficient steam cycle. Similarly, in second generation pressurized fluidized bed combustion systems, the residual char is combusted at 1500°-1600° F. which combustion temperature is maintained by extracting heat from the system and raising steam for a relatively less efficient steam cycle.

There are three main types of gasifiers suitable for use in an IGCC system: fixed bed gasifiers, fluidized bed gasifiers, and entrained-bed reactors.

One of the best known fixed-bed gasifiers is the Lurgi gasifier in which lump coal is pressurized in a multiphase lockhopper and introduced into the upper zone of a reactor. A mixture of air or oxygen and steam is fed to a lower portion of the gasifier. The coal flows slowly downward through drying, pyrolizing, reduction and combustion zones in the gasifier, producing a fuel gas and ash. In the most well known fixed-bed process for combined cycle application, the British Gas slagging Lurgi, the temperature of the lower gasifier zone is maintained above the ash melting temperature.

In an entrained-bed gasifier, finely pulverized coal and air or oxygen are introduced into a reactor where gasification occurs at a temperature greater than 1200° C. In most instances, the fuel is fed into the reactor as a slurry.

In fluidized bed gasifiers, fuel is introduced into the reactor and typically gasified at temperatures between about 750°-1000° C. Such a pressurized fluidized bed process is taught by U.S. Pat. No. 4,315,758.

See also U.S. Pat. No. 4,872,886, which teaches a two-stage upflow process for coal gasification in which a slurry of particulate carbonaceous material in a liquid carrier and a stream of oxygen-containing gas is burned in a fired horizontal slagging reaction zone, or first stage reactor, producing steam, vapor from the liquid carrier, char and gaseous combustion products, all of which are contacted in an unfired vertical second stage reactor with a second increment of slurry of particulate carbonaceous solids in a liquid carrier to yield steam, vapor from the liquid carrier, synthesis gas and char entrained in the gaseous effluent Slag produced in the first stage reactor is removed through a tap hole in the bottom of the reactor.

U.S. Pat. No. 4,338,283, and related U.S. Pat. No. 4,828,486, teach a fluidized bed combustor in which the combustion chamber and a regeneration chamber for regeneration of a desulfurizing agent are both contained within a single hollow body, the hollow body being vertically partitioned by a partition wall having an upper opening and a lower opening. Each chamber is provided with a perforated plate at the bottom on which a heat transfer medium containing a desulfurizing agent is placed and fluidized. The desulfurizing agent is transferred through the lower opening in the partition from the combustion chamber to the regeneration chamber and circulated by overflow through the upper opening back to the combustion chamber.

U.S. Pat. No. 4,407,206 teaches a process for partial combustion of coal containing more than 1% by weight sulfur and an organically bound calcium to sulfur ratio of at least 0.8 to 1 in which the coal is burned in a first combustion zone in the presence of an oxidizing agent, but under reducing conditions, producing a solid effluent and a gaseous effluent. After separation of the solid effluent from the gaseous effluent, the gaseous effluent is burned in a second combustion zone under oxidizing conditions.

U.S. Pat. No. 4,796,568 teaches a steam generating plant in which fuel, primarily coal, is burned in a fluidized bed of particulate material, such as limestone or dolomite, which serves as a sulfur absorbent. The vessel is divided into a combustion chamber and an ash chamber by an air distributor through which air for fluidization of the bed and combustion of the fuel is provided. The air distributor is provided with openings through which bed material can pass from the fluidized combustion chamber to the non-fluidized ash chamber.

U.S. Pat. No. 4,993,332 teaches a hybrid combustion system having a fluidized bed combustion portion and a pulverized coal combustion portion, the former including a fluidized bed chamber and the latter having at least one pulverized coal burner and an air recycling duct for recycling combustion air.

U.S. Pat. No. 4,815,418 teaches a boiler having two fluidized beds, pulverized coal being burned with air used as a fluidizing gas in the first fluidized bed and desulfurization of the resulting flue gases from the first fluidized bed which are used as fluidizing gases occurring in the second fluidized bed. See also U.S. Pat. No. 4,823,712 which teaches a bubbling bed, fluidized bed combustor capable of handling multiple fuels and U.S. Pat. No. 5,033,413 which teaches a fluidized bed combustion system having at least one circulating solids loop for fluidized bed particles.

SUMMARY OF THE INVENTION

It is an object of this invention to provide a simplified pressurized fluidized bed combustion system for generating electricity having a conversion efficiency in excess of 49%.

It is another object of this invention to provide a simplified pressurized fluidized bed combustion system for generating electricity which inhibits the emissions of oxides of nitrogen and sulfur.

It is yet another object of this invention to provide a simplified pressurized fluidized bed combustion system for electricity generation which generates an environmentally benign solid residue.

It is yet another object of this invention to provide an apparatus for partial combustion of coal in a advanced stage combustion system for generation of electricity in which only a single reactor train is required for combustion of the coal.

These and other objects are achieved in a process for generating a fuel gas from coal suitable for use in connection with a gas turbine in which, in a vertically stacked, three-stage combustor, a sorbent, preferably crushed limestone, crushed dolomite, or mixtures thereof, is calcined in a calciner zone of the three-stage combustor, producing a calcined sorbent in the form of calcium oxide and/or magnesium oxide. The calcined sorbent is transferred to a carbonizer fluidized bed zone disposed in said three-stage combustor directly below the calciner zone. Coal is introduced into a carbonizer fluidized bed supported upon and maintained fluidized by a carbonizer fluidizing gas introduced through a carbonizer perforated bed support grid disposed in the carbonizer fluidized bed zone and carbonized, producing hot gases, char and spent sorbent. The char and spent sorbent are transferred to a combustor fluidized bed supported upon and maintained fluidized by a combustor fluidizing gas introduced through a combustor perforated bed support grid disposed in a combustor fluidized bed zone in said three-stage combustor disposed below the carbonizer fluidized bed zone. The char is combusted in the combustor fluidized bed zone at a substoichiometric air-to-coal ratio, producing a fuel gas. Both the fuel gas produced in the combustor fluidized bed zone and the hot gases produced in the carbonizer zone are directed through the calciner zone to heat the sorbent therein. The fuel gas is cleaned to remove particulates and subsequently combusted in a turbine combustor to produce a flue gas which is introduced into a gas turbine for producing electricity.

An apparatus for partial combustion of coal in an advanced staged combustion system for generation of electricity in accordance with one embodiment of this invention comprises a wall enclosing a calciner zone, a carbonizer zone disposed below the calciner zone and a combustor zone disposed below the carbonizer zone. A perforated support grid supporting a fluidized bed through which a fluidizing gas is injected is secured to the wall and disposed in each of the carbonizer zone and the combustor zone. The apparatus further comprises means for transferring the calcined sorbent from the calciner zone to the carbonizer zone, means for transferring the char generated in the carbonizer zone from the carbonizer zone to the combustor zone, means for introducing a sorbent into the calciner zone, means for introducing coal into the carbonizer zone, means for introducing a fluidizing gas into the combustor zone, and means for removing ash from the combustor zone.

BRIEF DESCRIPTION OF THE DRAWINGS

These and other features of the process and apparatus of the this invention will be better understood from the following detailed description taken in conjunction with the figures, wherein.

DESCRIPTION OF PREFERRED EMBODIMENTS

The advanced staged combustion system for generating electricity from coal shown in FIG. 1 in accordance with one embodiment of this invention comprises a specially designed, staged fluidized bed partial combustor, the main functions of which are substoichiometric combustion of incoming coal, retention of sulfur in the solid residue generated therein, evolution of fuel bound nitrogen as molecular nitrogen, thus preventing formation of oxides of nitrogen in the later stages, and retention of heat in the fuel gas in the form of sensible and chemical heat for generating power from a relatively more efficient gas turbine prior to utilizing residual heat in a relatively less efficient steam cycle. The fuel gas produced in staged partial combustor 10 is at a temperature of about 1200° F. to about 1600° F. and is passed through barrier filter 11 which removes elutriated finds from the fuel gas before entering gas turbine combustor 12 and subsequently into gas turbine 13. Depending upon the turbine employed, partial combustor 10 operates at pressures between about 10 and about 20 atmospheres.

Figures 2, 3:
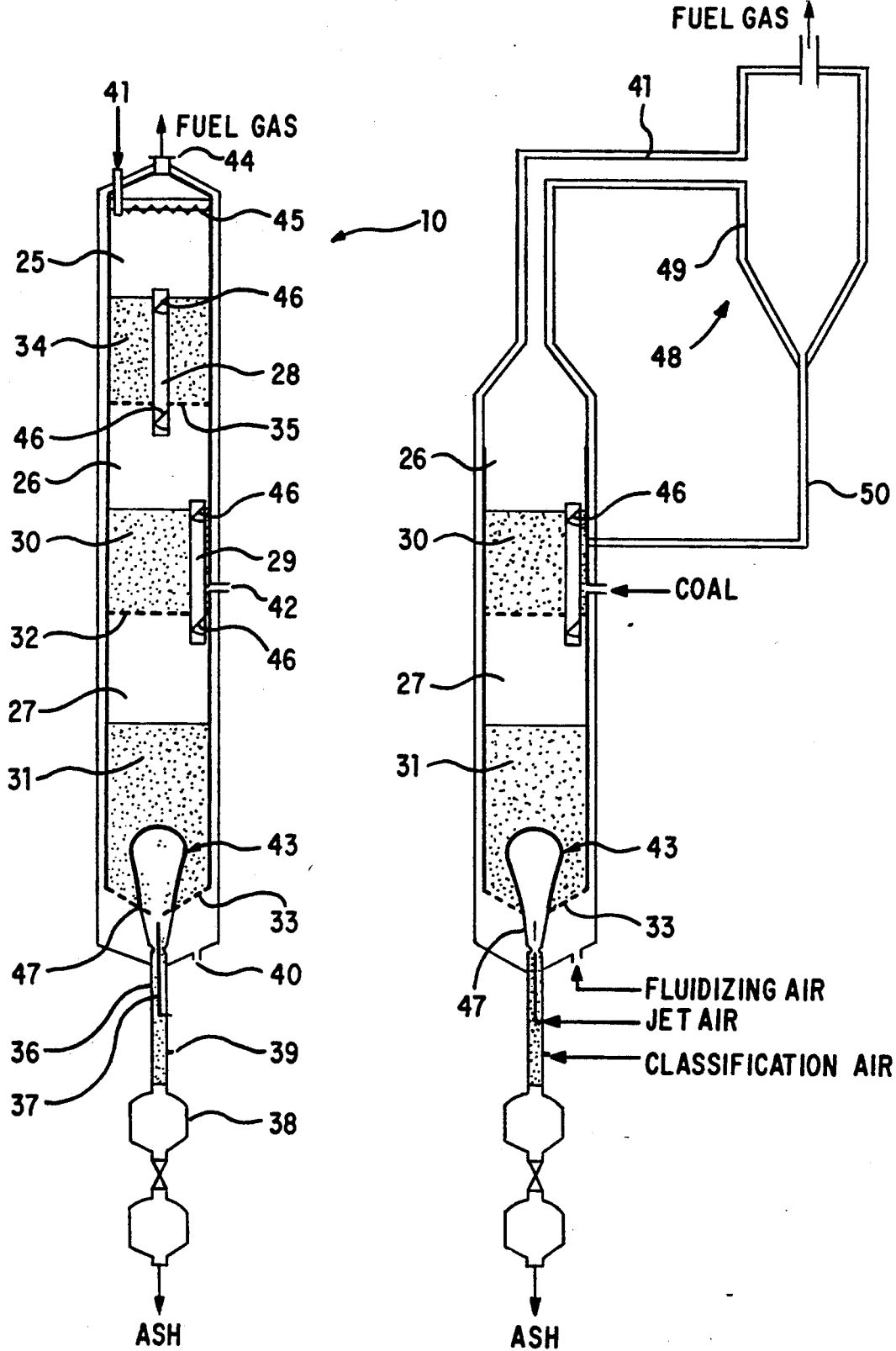
FIG. 2 is a schematic diagram of a fluidized bed partial combustor comprising three stacked, fluidized bed zones in accordance with one embodiment of this invention.
FIG. 3 is a schematic diagram of a partial combustor comprising a calciner zone in the form of a cyclonic calciner in accordance with one embodiment of this invention.

More specifically, and as shown in FIG. 2, partial combustor 10 is a vertically stacked, three-stage combustor comprising calciner zone 25 into which sorbent, preferably crushed limestone and/or crushed dolomite, is introduced together with air through sorbent inlet 41 and calcined, carbonizer zone 26 disposed below calciner zone 25 into which calcined sorbent from calciner zone 25 and coal are introduced and in which said coal is carbonized, producing hot gases, char and spent sorbent, and combustor zone 27 disposed below carbonizer zone 26 into which the char generated in carbonizer zone 27 is introduced, said char being combusted at a substoichiometric air-to-coal ratio, producing a fuel gas. Agglomerated solid residue generated in combustor zone 27 is withdrawn from partial combustor 10 through the base portion of combustor zone 27.

Fuel gas generated in partial combustor 10 is exhausted from partial combustor 10 and passed through barrier filter 11 in which elutriated fines from the fuel gas are removed. In accordance with one embodiment of this invention, the elutriated fines removed by barrier filter 11 from the fuel gas are returned through fines return 18 to partial combustor 10 for further processing. After passing through barrier filter 11, the fuel gas is introduced into gas turbine combustor 12 in which it undergoes combustion, producing flue gases at about 2300° F. and 15 atmospheres pressure which are subsequently introduced into gas turbine 13. In addition to driving generator 14, gas turbine 13 also drives turbine compressor 15 which provides air for partial combustor 10 and gas turbine combustor 12. The heat rejected by gas turbine 13 is recovered in heat recovery steam generator 16 which provides steam to a steam turbine (not shown).

The critical element of the advanced stage combustion system for power generation in accordance with this invention is partial combustor 10. FIG. 2 shows partial combustor 10 in accordance with one embodiment of this invention. Partial combustor 10 is comprised of three stacked fluidized bed zones, calciner zone 25, carbonizer zone 26 disposed below calciner zone 25, and combustor zone 27 disposed below carbonizer zone 26. The heat available from the fuel gas produced by partial combustor 10 is comprised of both chemical and sensible heat.

Partial combustor 10 is preferably operated under a pressure of about 10 to about 20 atmospheres. Partial combustor 10 has an internal diameter preferably between about 6 to about 12 feet and operates at a superficial velocity between about 3 to about 5 feet per second.

Figure 1:
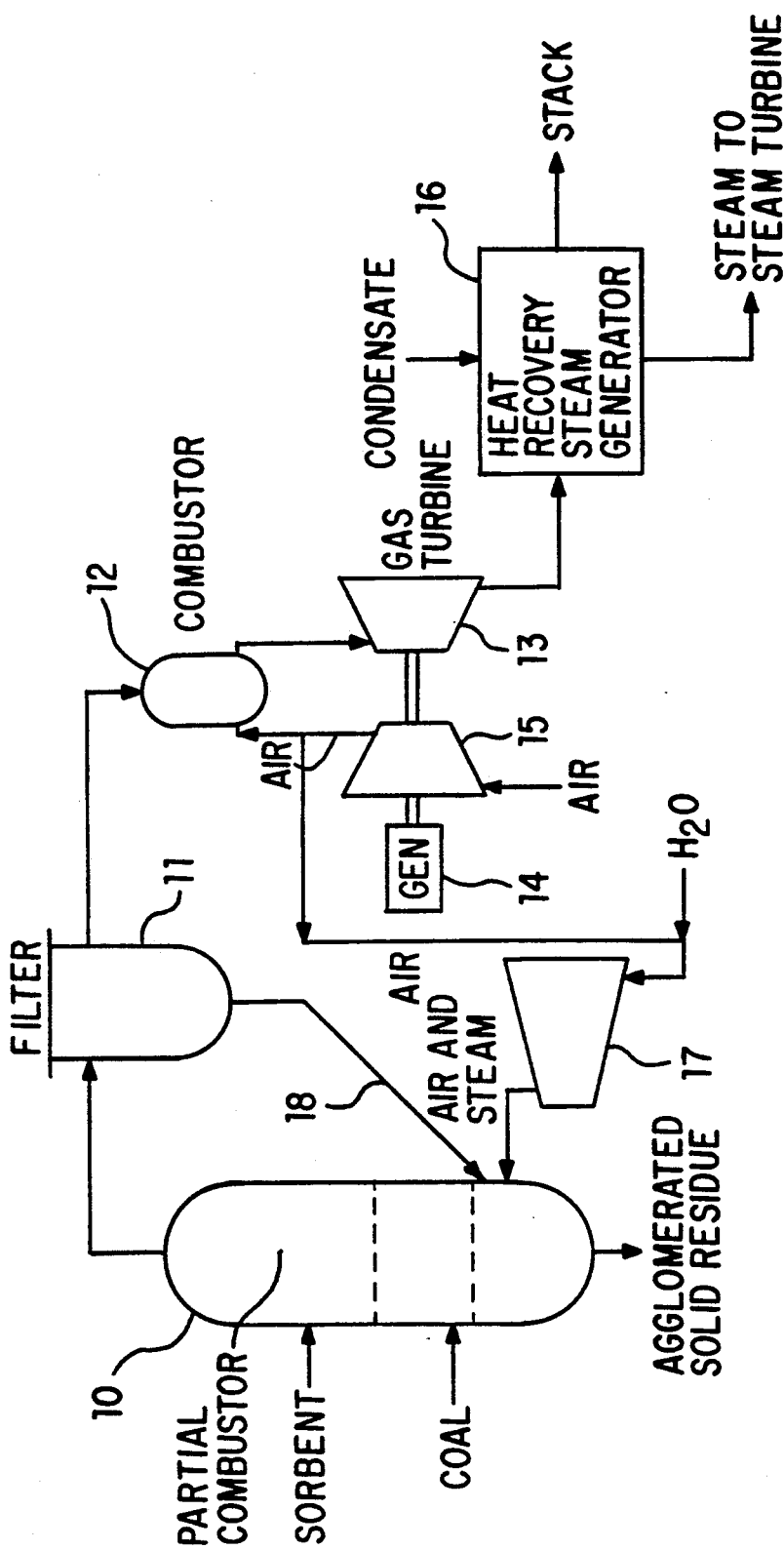
FIG. 1 is a schematic diagram of the advanced staged combustion system for power generation in accordance with one embodiment of this invention.

Fluidized bed air is supplied to partial combustor 10 through fluidizing air inlet 40 and is supplied by air compressor 17 shown in FIG. 1 which takes inlet air from turbine compressor 15. The hot air from turbine compressor 15 is first cooled, either through the use of water injection or by indirectly raising process steam before entering air compressor 17. In this way, the fluidized bed air temperature can be reduced to minimize compressor power requirements while supplying steam to partial combustor 10 for temperature control. Of the total stoichiometric air required for overall combustion, about 30% is compressed by air compressor 17 for introduction into partial combustor 10. All other air from turbine compressor 15, including the necessary excess air for combustion, is directed to turbine combustor 12 to burn the fuel gas produced in partial combustor 10.

In accordance with one embodiment of this invention, calciner zone 25 comprises calciner fluidized bed 34 supported on and maintained fluidized by a calciner fluidizing gas introduced through calciner perforated bed support grid 35. A sorbent, preferably crushed limestone and/or dolomite, is introduced into calciner fluidized bed zone 25 through sorbent inlet 41 in the form of a gravity feed system. The feed rate is controlled by a variable speed rotary feeder (not shown) or other suitable device. The sorbent is heated from ambient temperature to about 1450° F. by heat contained in the fuel gas rising from combustor zone 27 and carbonizer zone 26 disposed below calciner fluidized bed zone 25. The primary purpose of calciner fluidized bed zone 25 is to calcine the sorbent. The fluidization velocity in calciner fluidized bed zone 25 is preferably between about 3 to about 5 feet per second, depending on the size and type of sorbent used. The amount of sorbent introduced into calciner fluidized bed zone 25 in accordance with one embodiment of this invention is such that the molar ratio of calcium in the sorbent to sulfur in the coal to be gasified in partial combustor 10 is about 1.0 to about 3.0.

Calcination of the sorbent where the sorbent is limestone and/or dolomite produces calcium oxide and/or magnesium oxide in accordance with the following reactions:

$$CaCO_3 + heat \rightarrow CaO + CO_2$$

$$MgCO_3 + heat \rightarrow MgO + CO_2.$$

Fuel gas entering calciner fluidized bed zone 25 from carbonizer zone 26 disposed below calciner fluidized bed zone 25 in partial combustor 10 is at a temperature preferably between about 1500° F. to about 1800° F., facilitating almost complete calcination of the sorbent. Calcination of the sorbent in calciner fluidized bed zone 25 reduces the time necessary for sulfidation in carbonizer zone 26 and, thus, raises the sulfur-capture efficiency of carbonizer one 26.

The calcined sorbent, preferably calcium oxide and/or magnesium oxide, produced in calciner fluidized bed zone 25 is transferred into carbonizer zone 26 through sorbent overflow downspout 28 which can be internal or external of calciner fluidized bed zone 25 and is in communication with carbonizer zone 26. Sorbent overflow downspout 28 is provided with flap valve 46, which is pneumatic motor operated, at each end of sorbent overflow downspout 28 which can be controlled to introduce a measured amount of calcined sorbent to carbonizer zone 26. In addition, the level of calciner fluidized bed 34 can be controlled through the use of sorbent overflow downspout 28, the frequency of operation of flap valves 46, and the sorbent feed rate.

Calcinator zone 25 also serves the secondary purpose of further reducing the sulfur in the fuel gas produced in carbonizer zone 26 and combustor zone 27 by acting as a scrubber. As the fuel gas, at a temperature between about 1500° F. and about 1800° F., passes through calciner zone 25, residual sulfur therein not removed in carbonizer zone 26 as the fuel gas passes from combustor zone 27 through carbonizer zone 26 and into calcinator zone 25 will be removed in calcinator zone 25 in accordance with the following reaction:

$$CaO + H_2S \rightarrow CaS + H_2O$$

In addition, calcinator zone 25 provides cooling of the fuel gas and acts as a gas filter removing a high level of particulate and traces of tars and oils, although very little tars and oils are expected to be in the fuel gas due to the high temperatures of combustor zone 27 and carbonizer zone 26 disposed below calcinator zone 25. However, whatever tars are remaining in the fuel gas will be cracked by the lime in accordance with the following reaction:

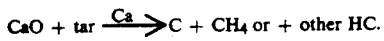

$$CaO + tar \xrightarrow{Ca} C + CH_4 \text{ or } + \text{other HC.}$$

As previously stated, the fuel gas rising through partial combustor 10 enters calciner zone 25 at a temperature between about 1500° F. and about 1800° F. The temperature in calciner zone 25 is maintained preferably between about 1200° F. to about 1600° F. The preferred temperature of the fuel gas exhausted from calciner zone 25 is about 1450° F., which temperature may be attained by combusting gas with air, if necessary, in calciner zone 25.

To prevent elutriation of the sorbent from calciner zone 25, mechanical impingement separator 45 is installed upstream of fuel gas outlet 44 and above calciner fluidized bed 34.

In accordance with one embodiment of this invention, calciner zone 25 is replaced by cyclonic calciner 48 as shown is FIG. 3 through which the sorbent and additional air as needed is introduced to maintain the exit fuel gas temperature at about 1450° F. In this case, the calcined sorbent is collected by cyclone 49 and returned through calcined sorbent return 50 to carbonizer zone 26.

Disposed below calciner zone 25 is carbonizer zone 26 containing carbonizer fluidized bed 30 supported by carbonizer perforated support grid 32 into which coal is fed through coal inlet 42. Coal size is not critical but the preferred coal size is ¼ inch×0. As previously described, calcium oxide produced in calciner zone 25 is transferred into carbonizer zone 26 through sorbent overflow downspout 28 which can be internal or external of calciner zone 25 and in communication with carbonizer zone 26.

The temperature of carbonizer zone 26 is preferably between about 1200° F. and about 1800° F. Heat from combustor zone 27 disposed below carbonizer zone 26 in partial combustor 10, as well as the addition of air to carbonizer zone 26, are used to maintain a temperature preferably between about 1500° F. and about 1600° F. in carbonizer zone 26. The primary purpose of carbonizer zone 26 is sulfur capture and coal carbonization, that is, coal devolatilization. About 10% of the stoichiometric requirement of combustion air for complete combustion of the coal is provided to carbonizer zone 26. At the control temperature of about 1500° F. to about 1600° F. under reducing conditions in carbonizer zone 26, sulfur-bearing molecules undergo a reaction to produce H₂S. The ability to control the temperature of carbonizer zone 26 independently of the processes occurring in calcincer zone 25 and combustor zone 27 allows beneficial sulfur capture according the following reaction:

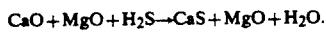

$$CaO + MgO + H_2S \rightarrow CaS + MgO + H_2O.$$

At a bed temperature of about 1550° F., up to 90% of the nitrogen in the coal, depending on coal type, is also released. Due to the reducing conditions present in carbonizer zone 26, the nitrogen is released as molecular nitrogen, ammonia, (NH₃), amines (RNH₂), and cyanide (HCN). The quantities of these nitrogen by-products released in carbonizer zone 26 depends greatly on the coal type being used.

As previously stated, hot gases produced in carbonizer zone 26 pass through calciner zone 25 to provide heat thereto. The char and spent sorbent containing calcium sulfide produced in carbonizer zone 26 are transferred through char overflow downspout 29 to combustor zone 27 disposed below carbonizer zone 26. Char overflow downspout 29 is disposed internal or external of carbonizer zone 26 and is in communication with combustor zone 27.

The char passing from carbonizer zone 26 to combustor zone 27 has a high Ca/S ratio due to the majority of sulfur being removed in carbonizer zone 26.

In combustor zone 27, combustion/gasification of the char occurs at a substoichiometric air-to-coal ratio. Less than 25% of the stoiohiometric requirement of oxygen for complete combustion of the coal is supplied to combuster zone 27. The temperature in combustor zone 27 is between about 1300° F. and about 2000° F., preferably between about 1500° F. and about 2000° F. Disposed within combustor zone 27 is combustor fluidized bed 31 supported on combustor perforated sloping grid 33.

Combustion of the coal is carried out primarily in combustor fluidized bed 31. Preferably between about 1500° F. and about 2000° F., the actual temperature of combustor fluidized bed 31 depends on the type of coal being combusted/gasified and will change in accordance with the requirements necessary to maintain non-slagging conditions of the ash. To remove ash from combustor zone 27, combustor perforated sloping support grid 33 is provided with opening 47 in a base portion thereof. Combustor zone 27 is provided with means for removing ash comprising density/size selective solids withdrawal conduit 36 with upflowing discharge control gas introduced through classification air inlet 39, said density/size selective solids withdrawal conduit 36 in communication with opening 47. Disposed within density/size selective solids withdrawal conduit 36 is central jet pipe 37, central jet pipe 37 having a discharge end positioned one of above, even with, or below opening 47. Air or fuel and air are injected through central jet pipe 37 into combustor fluidized bed 31 to produce central hot zone 43 in which a temperature between about 2200° F. to about 2600° F., preferably about 2500° F., is maintained. Central hot zone 43 is used to control agglomeration of ash generated in combustor fluidized bed 31, the resulting agglomerates of which are discharged from combustor fluidized bed 31 through density/size selective solids withdrawal conduit 36 into lockhopper dry ash disposal system 38.

Temperature control within combustor zone 27 is provided by endothermic carbon steam reaction, eliminating the need for in-bed heat transfer surfaces.

Calcium sulfide in combustor zone 27 is discharged therefrom against an air stream flowing through density/size selective solids withdrawal conduit 36 in which it reacts with oxygen to produce benign calcium sulfate according to the following reaction:

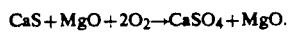

$$CaS + MgO + 2O_2 \rightarrow CaSO_4 + MgO.$$

Alternatively, the calcium sulfide and ash are vitrified in combustor zone 27 to form a stable residue which is also discharged against the flow of air through density/size selective solids withdrawal conduit 36. As in carbonizer zone 26, due to the reducing conditions in combustor zone 27, the remaining fuel-bound nitrogen is released as molecular nitrogen.

Due to the relatively high temperatures in combustor zone 27, preferably above 1800° F., low oxygen concentrations, and the presence of carbon monoxide, some of the sulfated lime is regenerated according to the following reaction:

$$CaSO_4 + CO \rightarrow CaO + SO_2 + CO_2.$$

This reaction occurs in conventional atmospheric fluidized bed combustors, but, in accordance with the process of this invention, any $SO_2$ released in combustor zone 27 is recaptured in carbonizer zone 26 and/or calciner zone 25. This reaction is unlikely to occur in central hot zone 43 of combustor fluidized bed 31 due to the presence of oxidizing conditions. Alternatively, it is possible to operate combustor zone 27 at about 1500° F. to about 1600° F. to minimize the loss of sulfur by adding a sodium-based flux which permits the vitrification of solid residue at a much lower temperature. It is important to note that approximately 90-95% of the sulfur present in the coal fed into partial combustor 10 is captured in partial combustor 10.

Fuel gas emanating from partial combustor 10 is passed through barrier filter 11 to remove particulate matter therein. The clean fuel gas is directed to turbine combustor 12, and subsequently gas turbine 13, while the solids removed by barrier filter 11 are recycled to combustor zone 27 for assimilation in the vitrification process.

Figure 4:
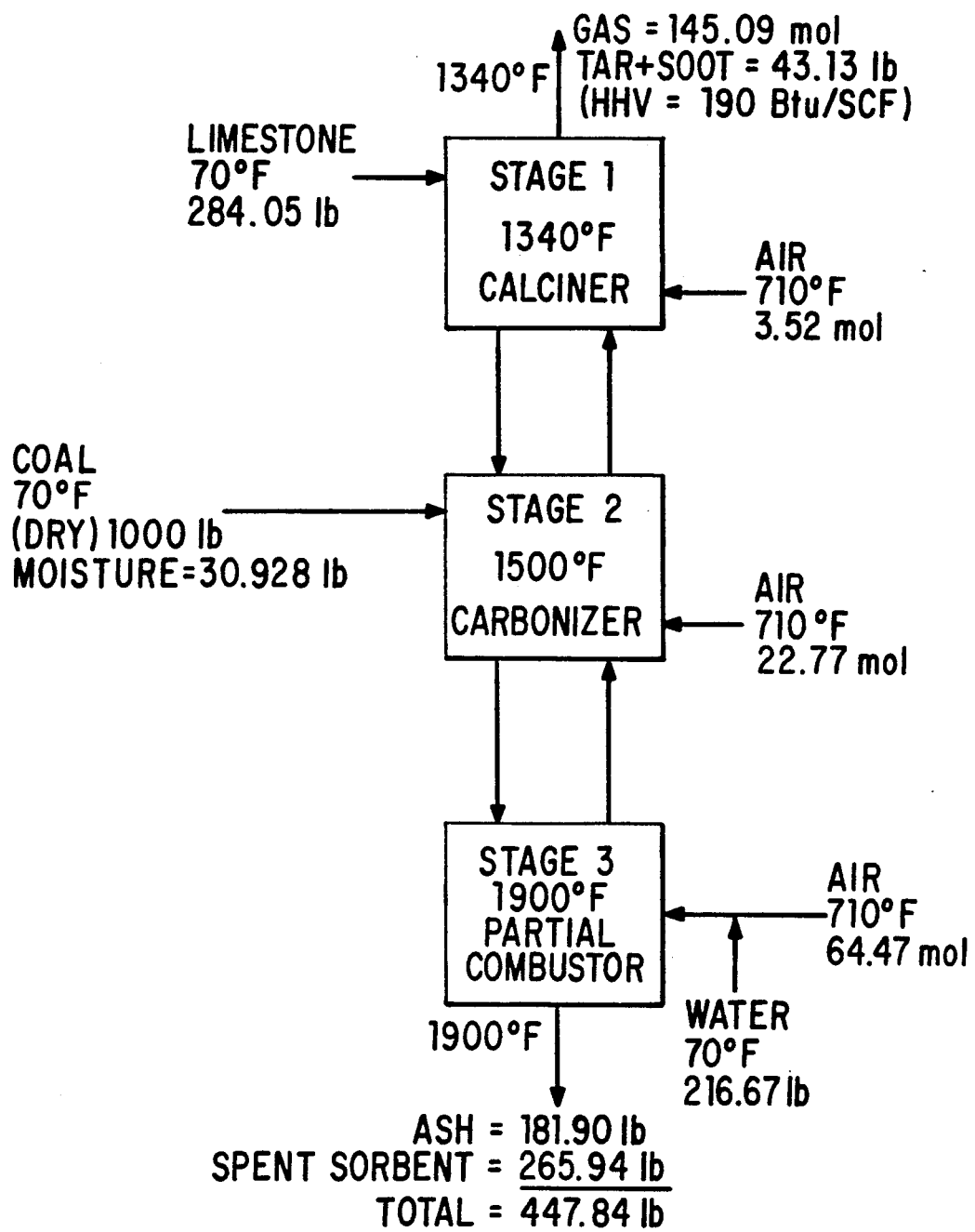
FIG. 4 is a schematic diagram showing a material balance for a partial combustor in accordance with one embodiment of this invention.

A typical material balance of partial combustor 10 in accordance with the process of this invention is shown in FIG. 4.

As previously stated, fuel gas produced in partial combustor 10 is combusted in turbine combustor 12 with excess air such that a flue gas entering gas turbine 13 is at a temperature of about 2300° F. Based upon processing 1,000 lbs. of coal containing 3363.3 kW energy, the power generated in gas turbine 13 after deducting power required for compressing the process air is 1247 kW for a 15 to 1 pressure ratio. In addition, power generated from the residual heat in the flue gas employing a conventional steam cycle (cooling flue gases to about 280° F. stack temperature) is 410.3 kW. Thus, the coal to electricity efficiency of the process in accordance with this invention is 49.3%.

While in the foregoing specification this invention has been described in relation to certain preferred embodiments thereof, and many details have been set forth for purposes of illustration, it will be apparent to those skilled in the art that the invention is susceptible to additional embodiments and that certain of details described herein can be varied considerably without departing from the basic principles of the invention.

We claim:

1. A process for generating a fuel gas from coal comprising:

in a vertically stacked, three-stage combustor, calcining a sorbent selected from the group consisting of crushed limestone, crushed dolomite and mixtures thereof in a calciner zone, producing a calcined sorbent in the form of at least one of calcium oxide and magnesium oxide;

transferring said calcined sorbent to a carbonizer fluidized bed zone disposed below said calciner zone;

introducing coal into a carbonizer fluidized bed supported upon and maintained fluidized by a carbonizer fluidizing gas introduced through a carbonizer perforated bed support grid disposed in said carbonizer fluidized bed zone;

carbonizing said coal, producing hot gases, char and spent sorbent;

passing said hot gases through said calciner zone;

transferring said char and said spent sorbent to a combustor fluidized bed supported upon and maintained fluidized by a combustor fluidizing gas introduced through a combustor perforated bed support grid disposed in a combustor fluidized bed zone disposed below said carbonizer fluidized bed zone; and combusting said char at a substoichiometric air-to-coal ratio, producing a fuel gas.

2. A process in accordance with claim 1, wherein said carbonizer fluidizing gas comprises said fuel gas.

3. A process in accordance with claim 1, wherein a pressure in said vertical stacked, three-stage combustor is between about 10 atmospheres and about 30 atmospheres.

4. A process in accordance with claim 1, wherein said sorbent is calcined at a calcination temperature between about 1200° F. and about 1600° F.

5. A process in accordance with claim 1, wherein said coal is carbonized at a carbonization temperature between about 1200° F. and about 1800° F.

6. A process in accordance with claim 1, wherein said char is combusted at a combustion temperature between about 1300° F. and about 2000° F.

7. A process in accordance with claim 1, wherein said fuel gas is passed from said combustor fluidized bed zone, through said carbonizer fluidized bed zone and said calciner zone, heating said sorbent from about ambient temperature to about 1450° F.

8. A process in accordance with claim 1, wherein the atmosphere in said carbonizer fluidized bed zone is a reducing atmosphere.

9. A process in accordance with claim 1, wherein said combustor fluidized bed comprises a central hot zone having a temperature in the range of about 2000° F. to about 2700° F.

10. A process in accordance with claim 1, wherein said sorbent is calcined in a calciner fluidized bed supported upon and maintained fluidized by a calciner fluidizing gas introduced through a calciner perforated bed support grid disposed in said calciner zone.

11. A process in accordance with claim 10, wherein said calciner fluidizing gas comprises at least one of said hot gas produced in said carbonizer fluidized bed zone and said fuel gas.

12. A process in accordance with claim 1, wherein ash generated in said combustor fluidized bed zone is agglomerated in said combustor fluidized bed zone and discharged through a density/size selective solids withdrawal system at a base of said combustor fluidized bed zone.

13. A process for generating electricity from coal comprising:

in a vertically stacked, three-stage combustor, calcining a sorbent selected from the group consisting of crushed limestone, crushed dolomite and mixtures thereof in a calciner zone, producing a calcined sorbent in the form of at least one of calcium oxide and magnesium oxide;

transferring said calcined sorbent to a carbonizer fluidized bed zone disposed below said calciner zone, said carbonizer fluidized bed zone comprising a carbonizer fluidized bed supported on a carbonizer perforated bed support grid;

introducing coal into said carbonizer fluidized bed zone;

carbonizing said coal, producing hot gases, char and spent sorbent;

passing said hot gases through said calciner zone;

transferring said char and said spent sorbent to a combustor fluidized bed zone disposed below said carbonizer fluidized bed zone, said combustor fluidized bed zone comprising a combustor fluidized bed supported on a combustor perforated sloping support grid;

combusting said char at a substoichiometric air-to-coal ratio, producing a fuel gas;

passing said fuel gas through said carbonizer fluidized bed zone and said calciner zone;

cleaning said fuel gas;

combusting said fuel gas in a turbine combustor, producing a flue gas; and introducing said flue gas into a gas turbine, producing electricity.

14. A process in accordance with claim 13, wherein a pressure in said vertical stacked, three-stage combustor is between about 10 atmospheres and about 30 atmospheres.

15. A process in accordance with claim 13, wherein said sorbent is calcined at a calcination temperature between about 1200° F. and about 1600° F.

16. A process in accordance with claim 13, wherein said coal is carbonized at a carbonization temperature between about 1200° F. and about 1800° F.

17. A process in accordance with claim 13, wherein said char is combusted at a combustion temperature between about 1300° F. and about 2000° F.

18. A process in accordance with claim 13, wherein said fuel gas is cleaned by passing said fuel gas through a filter, said filter removing particulates in said fuel gas.

19. A process in accordance with claim 13, wherein fluidized bed air supplied to said combustor comprises inlet air from a turbine compressor.

20. A process in accordance with claim 13, wherein said sorbent is calcined in a calciner fluidized bed supported on a calciner perforated bed support grid.

21. An apparatus for partial combustion of coal in an advanced staged combustion system for generation of electricity comprising:

a wall enclosing a calciner zone, a carbonizer zone disposed below said calciner zone and a combustor zone disposed below said carbonizer zone;

a perforated support grid supporting a fluidized bed through which a fluidizing gas is injected secured to said wall and disposed in each of said carbonizer zone and said combustor zone;

means for transferring a calcined sorbent from said calciner zone to said carbonizer zone in communication with said calciner zone and said carbonizer zone;

means for transferring a char from said carbonizer zone to said combustor zone in communication with said carbonizer zone and said combustor zone;

means for introducing a sorbent into said calciner zone in communication with said calciner zone;

means for introducing coal into said carbonizer zone in communication with said carbonizer zone;

means for introducing a fluidizing gas into said fluidized bed in said combustor zone in communication with said combustor zone; and means for removing ash from said combustor zone in communication with said combustor zone.

22. An apparatus for partial combustion of coal in accordance with claim 21, wherein said means for transferring a calcined sorbent from said calciner zone to said carbonizer zone comprises a sorbent overflow downspout disposed in said calciner zone, said sorbent overflow downspout having a sorbent flap valve disposed at each end.

23. An apparatus for partial combustion of coal in accordance with claim 21, wherein said means for transferring a char from said carbonizer zone to said combustor zone comprises a char overflow downspout disposed in said fluidized bed in said carbonizer zone, said char overflow downspout having a char flap valve disposed at each end.

24. An apparatus for partial combustion of coal in accordance with claim 21, wherein said perforated support grid disposed in said combustor zone is a sloping support grid having a sloping support grid opening in a base portion.

25. An apparatus for partial combustion of coal in accordance with claim 24, wherein said means for removing ash from said combustor zone comprises a density/size selective solids withdrawal conduit with upflowing discharge control gas in communication with said sloping support grid opening.

26. An apparatus for partial combustion of coal in accordance with claim 21, wherein said calciner zone comprises a calciner fluidized bed supported on and maintained fluidized by a calciner fluidizing gas introduced through a calciner perforated bed support grid.

27. An apparatus in accordance with claim 25, wherein a central jet pipe is disposed in said density/size selective solids withdrawal conduit, said central jet pipe having a discharge end positioned in one of above said sloping grid opening, even with said sloping grid opening and below said sloping grid opening.

28. In an advanced staged combustion system for power generation from coal comprising a fuel gas generator, a fuel gas combustor, a gas turbine generator set, a heat recovery steam generator, a steam turbine generator set and a gas cleaning system, the improvement comprising:

said fuel gas generator comprising a wall enclosing a calciner zone, a carbonizer zone disposed below said calciner zone and a combustor zone disposed below said carbonizer zone;

a perforated support grid supporting a fluidized bed through which a fluidizing gas is injected secured to said wall and disposed in each of said carbonizer zone and said combustor zone;

means for transferring a calcined sorbent from said calciner zone to said carbonizer zone in communication with said calciner zone and said carbonizer zone;

means for transferring a char from said carbonizer zone to said combustor zone in communication with said carbonizer zone and said combustor zone;

means for introducing a sorbent into said calciner zone in communication with said calciner zone;

means for introducing coal into said carbonizer zone in communication with said carbonizer zone;

means for introducing a fluidizing gas into said fluidized bed in said combustor zone in communication with said combustor zone; and means for removing ash from said combustor zone in communication with said combustor zone.

29. In an advanced staged combustion system for power generation from coal in accordance with claim 28, wherein said means for transferring a calcined sorbent from said calciner zone to said carbonizer zone comprises a sorbent overflow downspout disposed in said calciner zone, said sorbent overflow downspout having a sorbent flap valve disposed at each end.

30. In an advanced staged combustion system for power generation from coal in accordance with claim 28, wherein said means for transferring a char from said carbonizer zone to said combustor zone comprises a char overflow downspout disposed in said fluidized bed in said carbonizer zone, said char overflow downspout having a char flap valve disposed at each end.

31. In an advanced staged combustion system for power generation from coal in accordance with claim 28, wherein said perforated support grid disposed in said combustor zone is a sloping support grid having a sloping support grid opening in a base portion.

32. In an advanced staged combustion system for power generation from coal in accordance with claim 31, wherein said means for removing ash from said combustor zone comprises a density/size selective solids withdrawal conduit with upflowing discharge control gas in communication with said sloping support grid opening.

33. In an advanced staged combustion system for power generation from coal in accordance with claim 28, wherein said calciner zone comprises a calciner fluidized bed supported on and maintained fluidized by a calciner fluidizing gas introduced through a calciner perforated bed support grid.

34. In an advanced staged combustion system for power generation from coal in accordance with claim 32, wherein a central jet pipe is disposed in said density/size selective solids withdrawal conduit, said central jet pipe having a discharge end positioned one of above said sloping grid opening, even with said sloping grid opening and below said sloping grid opening.

* * * * *